United States Patent [19]

O'Connor et al.

[11] Patent Number: 5,376,713
[45] Date of Patent: Dec. 27, 1994

[54] LOW SETTING WATER-IN-OIL EMULSIONS

[75] Inventors: Michael N. O'Connor, Norwalk; Lesley J. Barker, Shelton; Roderick G. Ryles, Milford, all of Conn.

[73] Assignee: Cytec Technology Corp., Wilmington, Del.

[21] Appl. No.: 167,271

[22] Filed: Dec. 14, 1993

Related U.S. Application Data

[60] Division of Ser. No. 922,885, Jul. 30, 1992, Pat. No. 5,298,555, which is a continuation-in-part of Ser. No. 462,194, Jan. 9, 1990, abandoned.

[51] Int. Cl.$^5$ ................................. C08K 5/15
[52] U.S. Cl. .................... 524/728; 524/753; 524/801
[58] Field of Search ............. 524/728, 753, 801, 232, 524/377, 379

[56] References Cited

U.S. PATENT DOCUMENTS

| | | | |
|---|---|---|---|
| 3,624,019 | 11/1971 | Anderson | 524/555 |
| 3,826,771 | 7/1974 | Anderson | 524/606 |
| 4,024,097 | 5/1977 | Slovinsky | 524/801 |
| 4,152,307 | 5/1979 | Shibahara | 524/318 |
| 4,203,877 | 5/1980 | Baker | 524/500 |
| 4,339,371 | 7/1982 | Robinson | 524/458 |
| 4,528,321 | 7/1985 | Allen | 524/800 |
| 4,672,090 | 6/1987 | Chan | 524/728 |
| 4,764,574 | 8/1988 | Clark, Jr. | 526/207 |

FOREIGN PATENT DOCUMENTS

| | | |
|---|---|---|
| 174721 | 3/1985 | European Pat. Off. |
| 1319632 | 3/1970 | United Kingdom |

Primary Examiner—Joseph L. Schofer
Assistant Examiner—Jeffrey T. Smith
Attorney, Agent, or Firm—F. M. Van Riet

[57] ABSTRACT

Stable, water-in-oil emulsions are prepared wherein the aqueous phase thereof contains a water-soluble polymer and the oil phase thereof contains a partially esterified lower N,N-dialkanol fatty amine emulsifier by the emulsion polymerization of water-soluble monomers at a ratio of aqueous phase to oil phase of about 2 to 1 to about 3.5 to 1 and a monomer content of at least about 20%, by weight, wherein the polymerization is conducted in the presence of a second emulsifier comprising a non-ionic, reaction product of ethylene oxide and a long chain compound containing a reactive hydroxyl and/or carboxyl group and having an HLB of above 5 but less than 14, the total weight of the emulsifiers comprising about 1–5% of the emulsion wherein the second emulsifier constitutes from about 10 to about 150% of the weight of the fatty amide and contains less than 0.1 weight percent of sorbitan, sorbitol mixtures thereof and derivatives thereof.

9 Claims, No Drawings

LOW SETTING WATER-IN-OIL EMULSIONS

CROSS-REFERENCE TO RELATED APPLICATION

This is a divisional of co-pending application, Ser. No. 07/922,885, filed on Jul. 30, 1992, now U.S. Pat. No. 5,298,555, which in turn is a continuation in part of Ser. No. 07/462,194, filed Jan. 9, 1990, now abandoned.

BACKGROUND OF THE INVENTION

High molecular weight, water-soluble polymers are important articles of commerce. They are used in a great number of industrial processes to effect the separation of solid matter from aqueous streams by coagulation, flocculation, clarification, settling, retention and other mechanisms. A widely used form of these products is the water-in-oil emulsion which can be metered and pumped with or without a separately packaged inverting agent (usually after dilution in water) into a substrate system. Presently hundreds of millions of pounds of such water-in-oil emulsions are sold and used world-wide, in municipal and industrial waste treatments, in process streams in the mining and paper industries, and for enhanced oil recovery.

It is obviously desirable to provide such polymer products in stable compositions. Such an objective has been long sought after, shortly following the time this type of emulsion product was first introduced. For example, Anderson, et al, U.S. Pat. No. 3,826,771 points out that stability is a key factor in water-in-oil emulsions and defines stability as the ability to maintain the dispersion of the polymer particles throughout the emulsion for an extended period of time. Thus, water-in-oil emulsions of the water-soluble polymer, shipped and stored in drums or holding tanks, are desired with non-settling properties, so that dispensing of the product for its end-use does not require redispersing of the emulsion.

Generally, such a goal is achieved by reducing active polymer solids. However, this approach, while providing more stable products, leads to high shipping costs, larger storage facilities on site with the corresponding inconveniences and economic penalties.

The use of co-surfactants is well known in the literature and in the patent prior art. Becher in "Emulsions Theory and Practice; p 96, Reinhold Publishing Corporation, New York, 1957, discusses the stabilization of interfaces in oil-in-water emulsions using pairs of surfactants. Current art in the water-in-oil emulsions of water-soluble polymers include U.S. Pat. Nos. 4,672,090; 4,764,574; 4,528,321; and 4,024,097. Of these only '090 and '097 teach the use of the fatty alkanolamides in the surfactant pair. However, '090 teaches the use of sorbitan ester adducts as co-surfactants, and it has been found that such esters lead to high sedimentation, induce higher bulk viscosities and reduce stability. Slovinsky ('097) employs the fatty alkanolamides alone or teaches the use of co-surfactants which are ionic emulsifiers and which have very high HLB values. However, emulsifiers with high HLB values do not function well as co-surfactants producing unstable emulsions, frequently even in the preparative stage.

In the early development of water-in-oil emulsions containing water-soluble polymers for the treatment of process and waste streams in the water treating, paper and mining industries, especially those water soluble polymers containing acrylamide monomer units, active solids contents were restricted to 10 to 20% of the overall weight of the emulsion. For example, East German Patent No. 125,854 employs long chain amide and polyether surfactants to produce water-in-oil suspensions, but the active solids taught in the examples of this patent are all below 20%. Moreover, if one runs a polymerization using this teaching with the very low continuous phase (oil) ratio indicated, a coalescence of the dispersed phase occurs and a creamy product results. Creams are, by definition, of high viscosity ($>10,000$ mPa.s) and non-pourable. If a sedimentation test is run to demonstrate settling under field conditions, a complete sludge is obtained because there is insufficient oil present to keep the polymer particles from sticking to one another.

Current technology does allow water-in-oil emulsions to be prepared at 25% active solids or greater, but this is normally accomplished by increasing the active monomer contents in the aqueous phase and not by decreasing the oil content. Even still, such an advance is achieved at the expense of bulk viscosity of the finished emulsion, and at the expense of stability, usually with high sedimentation occurring on standing.

In fact, it is often deemed necessary to remove water or oil by a separation process in the manufacturing plant and before shipping in order to increase solids. Usually this is done by an evaporative process which is time-consuming and costly. In the present invention, overall active (polymer) solids are maintained above 20%, preferably at levels of 25 to 45%. However, if it is deemed desirable to concentrate the emulsions to a higher solids level this can be accomplished by an evaporative process.

SUMMARY OF THE INVENTION

The objective of this invention is to provide water-in-oil emulsions with superior stability, in a high polymer solids composition, but with a low bulk viscosity. A more specific goal of this invention is to provide a novel surfactant system which provides a high solids polymer in a water-in-oil emulsion with a high degree of stability as measured by a sedimentation index.

It has been discovered that stable, water-in-oil emulsions can be made by polymerizing water soluble monomers as high solids dispersions in oils using an emulsifier combination of 1) a partially esterified, dialkanol fatty amide, together with 2) a sorbitan-free, ethylene oxide adduct of a long chain (over $C_{10}$) compound having reactive hydroxyl and/or carboxyl groups and an HLB value between about 5 and 14, preferably about 6–9.

By "sorbitan-free", as used herein, is meant that the emulsifier is substantially free i.e. less than 0.1 weight percent, of sorbitan, sorbitol, mixtures thereof and derivatives thereof.

DESCRIPTION OF THE INVENTION INCLUDING PREFERRED EMBODIMENTS

Water-in-oil emulsions are composed of an aqueous phase comprising nonionic, and/or anionic or cationic monomer and an organic phase comprising an inert oil as continuous medium containing a surfactant system.

The instant invention relates to a stable, water-in-oil emulsion comprising an aqueous phase containing a water-soluble polymer and an oil phase containing a partially esterified lower N,N-dialkanol fatty amide emulsifier, the ratio of the aqueous phase to the oil phase ranging from about 2 to 1 to about 3.5 to 1 and the polymer content of the emulsion being at least about 20%, by weight, based on the total weight of the emulsion, wherein said oil phase also contains a second emulsifier comprising a non-ionic, sorbitan-free, reaction product of ethylene oxide and a long chain compound containing a reactive hydroxyl and/or carboxyl group and having an HLB above 5 but less than 14, the total weight of the emulsifiers constituting about 1–5% of the emulsion, the second emulsifier being from about 10 to about 150% of the weight of the fatty amide.

The instant invention also relates to a process for preparing a stable, water-in-oil emulsion containing a water-soluble polymer by the emulsion polymerization of water-soluble monomers in the presence of a partially esterified, lower N,N-dialkanol fatty amide emulsifier, the ratio of the aqueous phase to the oil phase ranging from about 2 to 1 to about 3.5 to 1 and the monomer content of the emulsion being at least about 20%, by weight, based on the total weight of the emulsion, the improvement which comprises polymerizing said monomers in the presence of a second emulsifier comprising a non-ionic, sorbitan-free, reaction product of ethylene oxide and a long chain compound containing a reactive hydroxyl and/or carboxyl group and having an HLB of about 5 but less than 14, the total weight of the emulsifiers constituting about 1–5% of the emulsion, the second emulsifier being from about 10 to about 150% of the weight of the fatty amide and said oil containing a cyclic paraffinic hydrocarbon.

Useful monomers include (meth) acrylamide, alone, or in conjunction with, copolymerizable ethylenically unsaturated monomers such as, alkyl acrylates, and methacrylates, acrylonitrile, vinyl acetate, N-vinylpyrrolidine, N,N-dimethylacrylamide, N-vinylacetamides, acrylic and methacrylic acids and their salts, 2-acrylamido-2-methylpropane sulfonic acid and its salts, dialkylaminoalkyl acrylates and methacrylates and their acid and quaternary salts; dialkylaminoalkyl acrylamides and methacrylamides and their acid and quaternary salts; dialkyl diallylammonium halides, N-and C-vinyl imidazoles and their quaternized derivatives, various N-vinylpyridines and the like. Preferred monomers include acrylamide, acrylic and methacrylic acids and their salts and quaternized dialkylaminoethyl acrylates and methacrylates, quaternized dimethylaminopropylmethacrylamide and dimethyldiallylammonium chloride, and appropriate combinations thereof.

Hydrolyzed acrylamide polymers can be produced in-situ in place of acrylamide/acrylic acid copolymers, and cationic copolymers may be made by the Mannich reaction which is well known an taught in the prior art.

In production, the initial monomer emulsion is polymerized by methods well known in the art, usually by free radical initiation, and a high solids polymer dispersion is produced. The oils used contain paraffinic hydrocarbons alone or in admixture with aromatic hydrocarbons and have chain lengths of 6 to 10 carbon atoms or greater. Benzene, toluene, xylene, hexane, octane and other paraffins, isoparaffins and napthenics are known and are useful in the process disclosed herein in conjunction with said cyclic paraffins.

Generally, mixtures of these solvents are employed. An especially useful oil is the low odor cyclic paraffin containing solvent (LOPS)® sold by the EXXON Company, USA.; its typical inspections are as follows:

| LOW ODOR PARAFFIN SOLVENT | | Test Method |
|---|---|---|
| Solvency | | |
| Aniline point °C. (°F.) | 74 (165) | ASTM D 611 |
| Kauri-butanol value | 29 | ASTM D 1133 |
| Volatility | | |
| Flash point, TCC, °C. (°F.) | 70 (158) | ASTM D 56 |
| Vapor pressure psia @ 100° F. | 0.02 | ASTM D 2879 |
| Distillation, °C. (°F.) (1) | | ASTM D 86 |
| CIP | 197 (386) | |
| 10% | 206 (403) | |
| 50% | 216 (420) | |
| 90% | 241 (466) | |
| Dry point | 241 (465) | |
| FBP | 452 (485) | |
| Autoignition Temp. °C. (°F.)$^{(1)}$ | 216 (420) | ASTM D 2155 |
| General | | |
| Aromatics content, % | 3.0 | Ultra-violet Analysis |
| Sulfur content, ppm | 1 | Microcoulometer |
| Chlorides, ppm | 2 | Exxon Method |
| Unsolfonated residue, % | 96 | ASTM D 482 |
| Gravity, °API | 45.7 | ASTM D 287 |
| Specific gravity @ 15.6°/15.6° | 0.799 | ASTM D 1250 |
| Approx. avg. molecular wt. | 180 | Cryoscopic |
| Viscosity cST @ −1° C. (30° F.) | 11.6 | ASTM D 445 |
| Viscosity cST @ 16° C. (60° F.) | 2.6 | |
| Viscosity cST @ 38° C. (10° F.) | 1.71 | |
| Viscosity cST @ 99° C. (210 F.) | 0.81 | |
| Surface tension, dynes/cm | 25.4 | du Nuoy |
| Copper corrosion, 3 hr @ 100° C. (212° F.) | 1 | |
| Color, Saybolt | +30 | ASTM D 156 |

Other useful oils of similar characteristics are: Isopar M ® marketed by the EXXON Company; KENSOL 61 ® marketed by the WITCO Corporation; LOBX ® solvent marketed by Ashland Corporation; LPA ® solvent marketed by VISTA Chemical Co., and SHELL SOL 140 ® marketed by the Shell Chemical Company.

The partially esterified, lower N,N-di and trialkanol fatty amide emulsifiers are well known to those skilled in the art. They are oil soluble and generally contain from 15–22 carbon atoms in the fatty group. The lower N,N-dialkanol fatty amide is generally esterified with an acid in a mole ratio of acid to amide of about 0.20:1 to about 0.80 to 1.

The esterification of the hydroxy group in the alkanolamine preferably takes place with the same fatty acid as forms the amide group and this acid may contain oleyl, linoleyl and palmityl chains. (The degree of esterification is usually less than about 50%). A further description of this surfactant type and its sourcing is found in East Germany 125,854: U.S. Pat. No. 4,024,097 and 4,672,090, discussed above and hereby incorporated herein by reference.

The primary surfactant and the co-emulsifier(s) are weighed into the oil phase. Together they represent 1 to 5% of the total weight of the water-in-oil emulsion and preferably 1.5 to 3%. The co-surfactant is used at levels of about 10 to about 150% of the weight of the primary surfactant preferably about 20 to about 75 weight %. While these levels have proven to be useful in most instances, it must be understood that as the HLB of the co-surfactant increases, the SI has a tendency to increase also. Therefore, higher HLB co-surfactants should be used at the preferred levels, or lower % of co-surfactant.

The ratio of aqueous phase to oil phase, wherein the water soluble monomers are part of the aqueous phase and the surfactants are calculated as part of the oil phase ranges from 2 to 1 to 3.5 to 1.

Examples of the sorbitan-free emulsifiers which function as the co-surfactants herein are reaction products of ethylene oxide and a long chain compound having a reactive hydroxyl and/or carboxyl group of 5-14 HLB. Examples include reaction products of fatty alcohols and about 3 to 12 moles of ethylene oxide; linear synthetic alcohols having at least 12 carbon atoms condensed with about 3-10 moles of ethylene oxide; aliphatic aromatic alcohols such as nonyl phenol; dioctyl phenol etc; reacted with about 3-10 moles of ethylene oxide; copolymers of polyhydroxystearic acid and polyethylene glycol, and combinations of the above.

These emulsifiers are also known in the art as taught in U.S. Pat. Nos. 4,203,877; 4,339,371; 4,152,307; 4,764,574 and British Patent 1,319,632, all of which are hereby incorporated herein by reference.

The novel water in oil emulsions prepared using the ingredients described herein have low bulk viscosities and also an unusual degree of stability. Low bulk viscosities, i.e., in the range of 200 to 1000 cps measured by Brookfield viscometer on the product emulsion are important because they are more easily mixed and pumped, heat transfer during polymerization is reduced, complete removal from storage is attained etc.

Stability is measured by a sedimentation index (SI) on a scale of 1 to 100. To determine the SI, one weighs 42.6 gm of the emulsion into a graduated 50 cc centrifuge tube fitted into a 4 place rotor, and spins down the sample for 1 hour at 2600 rpm using a centrifuge. After one hour, the volume of separated liquid is noted, the pourable liquid is removed and the tube, is allowed to drain from an inverted position for 3½ hours. The remaining sediment is then weighed and calculated as a % of the original sample weight. SI values above 15 indicate a degree of instability such that after standing in the field for 4 to 6 months, depending on ambient conditions, the emulsion will deposit a thick sludge. In such a condition, such emulsions are heterogeneous and direct sampling leads to low or no activity upon inversion into water and application in an end use as the top layer of the drum is removed. Moreover, compacted polymer at the bottom of the vessel is very difficult to remove and a significant amount of active polymer is lost.

By the teachings of the present invention, SI values of about 15 or below, preferably in the range of 1 to 10, are readily achieved while most prior art emulsions give SI values substantially higher.

The water-in-oil emulsions of the present invention are also high in active polymer solids content. As indicated previously, oil phase ratios of the instant invention are maintained at about 20 to 35% of the total emulsion, the aqueous phase varying from about 65 to 80%. The overall active polymer content, i.e., the monomer content based on the overall weight of emulsion is above 20% and preferably above 25%.

The following examples are set forth for purposes of illustration only and are not to be construed as limitations on the present invention except as set forth in the appended claims. Parts and percentages are on a weight/weight (w/w) basis, unless specified otherwise.

EXAMPLES 1-15

Inverse emulsions containing copolymers of acrylamide (AND), 90 mole %, and acryloyloxyethyltrimethylammonium chloride (AETAC), 10 mole %, are prepared using the procedure of U.S. Pat. No. 4,022,731. The initiator system is a redox couple: bromate plus gaseous sulfur dioxide. Bulk viscosities are determined at 25±0.5° C. using a Brookfield LVT viscometer with a #2 spindle at 12 rpm.

The primary surfactant used in this series is a reaction product of oleic acid and diethanol amine being about 60% diethanol oleamide, remainder esters, (FDAE). Co-surfactants shown are 1) ethoxylated long chain linear alcohols, 2) ethoxylated sorbitan monocleate and 3) a sorbitan monooleate/ethoxylated sorbitan monooleate mixture. The total amount of emulsifiers is 2.0-2.08%, based on the total emulsion. The combined monomers represent 33%, based on the total emulsion. The oil is LOPS in the amount of 25.70-25.78%, based on the total emulsion. A sequestrant and coagulation additive are also added. The results of this series of runs are listed in Table I.

TABLE I

| Example | (a) % FDAE | Co-surfactants | HLB (Co-surf) | (a) % | (b) Visc | (c) SI (%) |
|---|---|---|---|---|---|---|
| 1 | 1.66 | Reaction product of Oleyl alcohol and 5 moles of ethylene oxide. | 8.8 | 0.42 | 410 | 4.0 |
| 2 | 1.66 | Reaction product of Oleyl alcohol and 10 moles of ethylene oxide. | 12.4 | 0.42 | 440 | 3.7 |
| 3 | 1.66 | Reaction product of C12-15 linear alcohol and 3 moles of ethylene oxide. | 7.6 | 0.42 | 1040 | 12 |
| 4 | 1.66 | Reaction product of C12-15 linear alcohol and 3 moles of ethylene oxide. | 7.9 | 0.42 | 1375 | 15 |
| 5C | 1.66 | Reaction product of Sorbitan monosterate and 4 moles of ethylene oxide. | 9.6 | 0.42 | 1585 | 27* |

TABLE I-continued

| Example | (a) % FDAE | Co-surfactants | HLB (Co-surf) | (a) % | (b) Visc | (c) SI (%) |
|---|---|---|---|---|---|---|
| 6C | 1.50 | Blend of Sorbitan monooleate with the reaction product of sorbitan monostearate and 4 moles of ethylene oxide. | — | 0.25 / 0.25 | 1585 | 26* |
| 7C | 2.00 | None | — | 0 | 1650 | 25 |
| 8C | 1.66 | Polyethylene glycol reacted with propylene oxide (mw 2150) | 4.1 | 0.42 | inverted | |
| 9C | 1.66 | Polyethylene glycol reacted with propylene oxide (mw 3600) | 6.0 | 0.42 | 1575 | 25 |
| 10 | 1.66 | Polyethlene glycol (400 MW) Distearate | 8.1 | 0.42 | 1740 | 16 |
| 11 | 1.66 | Nonyl phenol reacted with 4 moles of ethylene oxide. | 8.9 | 0.42 | 640 | 9.5 |
| 12 | 1.66 | Blend of co-surfactant of Ex. 11 with nonyl phenol reacted with 6 moles of ethylene oxide. | 9.6 | 0.27 | 608 | 7.1 |
| 13 | 1.66 | Oleyl alcohol reacted with 3 moles of ethylene oxide. | 6.6 | 0.42 | 330 | 2.8 |
| 14 | 1.66 | Oleic acid reacted with polyethylene glycol (MW 200). | 7.6 | 0.42 | 350 | 1.5 |
| 15 | 1.76 | $C_{12}$–$C_{14}$ linear alcohol reacted with 6.5 moles of ethylene oxide. | 12.0 | 0.35 | 315 | 4.2 |

Footnotes to Table I
(C) Comparative
(a) The % surfactants is a wt/wt relationship based on the total emulsion.
(b) Measured on the Brookfield viscometer as indicated above.
(c) This represents the % sediment in the centrifuge test.
*Testing of equivalent SI valued commercial emulsions resulted in a storage stability < 6 months.

The data of Table I show that long chain alcohol reaction products with ethylene oxide give unexpectedly good results compared to sorbitan containing products, see 5C and 6C. Thus, the high solids emulsions of the present invention have low sedimentation indices demonstrating their long term field storage stability at high polymer solids. The data also shows that FDAE alone is not efficient and that all ethoxylated surfactants, e.g. 8C and 9C, are not necessarily equivalent.

EXAMPLE 16

The polymerization procedure of Examples 1 to 15 is repeated with only one major change. As co-surfactant, the polymeric adduct of polyethylene glycol described in Example 17 is used along with the FDAE. The relative amounts are 1.66% surfactant (FDAE) and 0.39% co-surfactant. A copolymer emulsion product is obtained with a low bulk viscosity (585 cps), low sedimentation index and low oil separation. In the centrifuge test only 12% sediment is obtained.

EXAMPLE 17

The polymerization procedure of Examples 1 to 15 is repeated with acrylamide monomer alone at 26.5%, overall, to produce a homopolymer water-in-oil emulsion, with the following modifications: t-butyl hydroperoxide (0,002%) catalyst along with sodium metabisulfite (the latter is added continuously to maintain a exotherm to 40oC) is substituted for the redox pair and the co-surfactant is changed. In this example, the same fatty dialkanolamide ester (FDAE) is used at a 2.09% level, and a polymeric surfactant made by reacting condensed 12-hydroxystearic acid with polyethylene oxide having an HLB of six and purchased from Imperial Chemical Industries, Ltd., as Rapisol B-246, is incorporated as co-emulsifier at a 0,418% level.

The resultant emulsion has a bulk viscosity of 415 cps, and a sedimentation index (SI) of 2.4%. Moreover, very little oil separates in the centrifugation test, indicating an added stability feature.

EXAMPLE 18

An anionic copolymer of acrylamide is produced using ammonium acrylate as comonomer at a 30 mole % level at 30% overall active polymer solids based on the free acid form. The oil phase contains 2% total emulsifier, based on total batch, dissolved in the oil which is used as the continuous phase. The primary co-surfactant, is again an oleic acid diethanolamine reaction product, at a level of 1.33%, and as co-surfactant, an oleic acid-ethylene oxide adduct, purchased as Pegosperse 400M, from Lonza Inc. of Fairlawn, N.J., and having an HLB of 11, is employed at 0.67% of the total batch. Polymerization is initiated using a combination of t-butyl hydroperoxide, followed by gaseous sulfur dioxide which is metered in. After polymerization is complete, the resultant water-in-oil emulsion has a bulk viscosity of 378 cps and a sedimentation index of 4.35%.

EXAMPLE 19

This is a demonstration of the application of the present invention to the preparation of an inverse emulsion containing an anionic terpolymer of acrylamide, ammonium acrylate and acrylic acid. An aqueous phase is prepared as in Example 18 and partially neutralized with ammonia. The oil phase consists of a paraffinic solvent, an oleic acid diethanolamine reaction product, a mixed $C_{12}$-$C_{15}$ primary alcohol reacted with 3 moles of ethylene oxide (HLB 7.6) and an oleyl alcohol reacted with 3 moles of ethylene oxide (HLB 6.6) such that the total emulsifier concentration on monomer emulsion equals 2%, by weight, and the weight ratio of the oleic acid reaction product with diethanolamine to the co-emulsifiers individually is 3/1. Polymerization is effected by means of a redox initiator system as described in Examples 1-15. After polymerization is complete, the resulting terpolymer emulsion has a bulk viscosity of 365 cps and sedimentation index of 10.

EXAMPLES 20-23

These examples demonstrate the use of substituted phenol ethoxylates as co-surfactants in the present invention, and also the importance of the HLB value of the emulsifier used. In each run, 1.66% of the fatty amide ester of Example 1-15 is used as the principal surfactant and the polymer composition of Examples 1 through 15 are manufactured. Table II compiles the data.

TABLE II

| Example | Co-surfactant | HLB | % | Visc. (cps) | SI (%) |
|---|---|---|---|---|---|
| 20 | A blend of ethyloxated nonylphenols.[a] | 6.5[b] | 0.42 | 750 | 12 |
| 21 | Dialkylphenol ethoxylate[c] | 13 | 0.42 | 375 | 3.6 |
| 22 | Nonylphenol ethoxylate[d] | 13.5 | 0.42 | 240 | 11 |
| 23C | Nonylphenol ethoxylate[e] | 14.1 | 0.42 | 1252 | 68 |

[a]Average ethylene oxide content per nonylphenol is about 3.
[b]Calculated value.
[c]Purchased as Igepal DM710 from GAF Corporation of Wayne, NJ.
[d]Contains about 10 ethylene oxide units per one nonylphenol.
[e]contains about 12 ethylene oxide units per one nonylphenol.

The data of Table II show the marked improvements achieved using ethoxylated alkylphenols with HLB values below 14. They can be directly compared with the sorbitan adducts of the prior art (see Examples 5C and 6C in Table 1). Moreover, once the degree of hydrophobicity is reduced because the ethylene oxide chain length is reduced, and the HLB exceeds about 14, the amount of sediment obtained is much greater (Example 23C).

EXAMPLE 24: (Comparative)

This example demonstrates the effect of using a co-surfactant with a low HLB value. The principal surfactant and the amount used (1.66%) is kept the same as in Examples 20-23. An oleyl alcohol reacted with 2 moles of ethylene oxide, having an HLB of 5, is employed as the co-emulsifier at a level of 0.42%, and the polymer composition of Examples 1 through 15 is synthesized using the same polymerization recipe. The results show that a water-in-oil emulsion with a bulk viscosity of 1805 cps is obtained, which in the centrifuge test described, has a sedimentation index of 20. Thus, the short chain length of ethylene oxide units in reducing the HLB value of the co-surfactant leads to an inferior and unacceptable emulsion.

EXAMPLE 25

This run demonstrates that good results are obtained when using a mixture of two types of co-surfactants, one the linear alcohol ethoxylate employed in Example 4 and the other the polymeric ethylene oxide copolymer adduct used in Example 17. The same composition (an AMD/AETAC copolymer) is manufactured using the same recipe except that the emulsifier content is as follows:

| | |
|---|---|
| FDAE (surfactant) | 1.24% |
| Co-surfactant Example 4 | 0.42% |
| Co-surfactant Example 17 | 0.39% |

The product viscosity is 850 cps and the SI value 11, exhibiting improved stability to sedimentation.

EXAMPLE 26

In this example the surfactant system of the present invention is used to copolymerize acrylamide and a higher level of the cationic monomer AETAC employed in Examples 1 through 15. The same recipe is used except that 14.2 parts (60 mole %) of acrylamide are dissolved in the water phase along with 25.80 parts (40 mole %) of the AETAC. The continuous phase is a refined paraffinic solvent sold as LPA oil by the Vista Chemical Company. The primary surfactant is FDAE (2.11%) and the co-surfactant is that of Example 17 (0.42%). Polymerization is initiated and controlled by metering in gaseous sulfur dioxide. The resultant water-in-oil emulsion has a bulk viscosity of 690 cps, and the SI by the centrifuge test is 7.7%.

EXAMPLE 27

The polymerization recipe and technique of Examples 1 through 15 is used to copolymerize acrylamide and a different cationic monomer, viz, diallyldimethylammonium chloride (DADM). Seven mole % of the DADM are dissolved in the aqueous phase along with 93 mole % of acrylamide. The total monomer concentration is 31% and the pH of the aqueous phase is adjusted to 4. Two other changes are made. The FDAE surfactant is used at 1.5 weight % on the batch and the co-emulsifier is that of Example 17, used at 0.30%. The pair is weighed into the refined paraffinic solvent of Example 26.

The resultant copolymer emulsion has a bulk viscosity of 305 cps and returns a 5.8% SI value in the centrifuge test.

EXAMPLES 28-30

The following examples show the effect of varying the relative amounts of the two surfactants in a typical formulation. The copolymer of Examples 1 through 15 is prepared using the same polymerization recipe. The total emulsifier level employed in each run is reduced to 1.08%, based on the water-in-oil emulsion, but the individual amounts of surfactant and co-surfactant are varied. The primary emulsifier is the same (FDAE), and the co-emulsifier is a reaction product of oleic acid with 4.5 moles of ethylene oxide having an HLB of 7.6. The results are compiled in Table III.

TABLE III

| Example | FDAE/Co-Surf Ratio (Wt./Wt.) | Visc. (cps) | SI (%) |
|---|---|---|---|
| 28 | 1:1 | 435 | 4.9 |
| 29 | 3:1 | 375 | 2.5 |
| 30 | 5:1 | 375 | 2.0 |

The results show the excellent product stabilities using the surfactant pairs of the present invention in varying ratios. When a higher HLB co-surfactant is employed at the 1:1 ratio along with the FDAE, e.g., the co-surfactant of Example 11, the polymerization product separates on standing and fails the test. Use of higher ratios of the FDAE with this co-surfactant, viz., 3:1 and 5:1, leads to good results in that stable emulsions are formed with low SI values, as seen in Example 11.

EXAMPLE 31 (Comparative)

The following is an example run using the teachings of Example 1 of East German Patent No. 125,854. The ingredients and procedures chosen for this run are selected so as to simulate as closely as possible this prior art. A 1/1 ratio of FDAE to co-emulsifier is employed where the co-emulsifier is a reaction product of stearic acid and 9.5 moles of ethylene oxide having an HLB of 11.4.

| | Weight (gms) |
|---|---|
| A. Aqueous Phase | |
| 51.7% Acrylamide Solution | 133.91 |
| Glacial Acrylic Acid | 46.15 |
| 10% Sequestrant solution | 1.15 |
| 50% Sodium Hydroxide solution | 46.15 |
| Deionized Water | 452.64 |
| B. Oil Phase | |
| Isoparaffinic hydrocarbon | 46.16 |
| Co-emulsifier | 1.92 |
| FDAE | 1.92 |

The aqueous phase is prepared in a suitably sized reactor equipped with stirrer, thermometer and nitrogen inlet and outlet, the oil phase is added with good stirring and then 290 mg of 2,2'-azobis (2-amidinopropane) hydrochloride dissolved in 25 cc of deionized water are added @ 22° C. Nitrogen flow is started and after 37 minutes the batch is heated to 40.9° C. over 1 hour. At 34° C., the batch starts thickening and by the time the temperature reaches 37° C., the reaction mixture is a viscous coalescent mass attached to the stirrer. As the temperature rises above 40.9° C., the mass slowly disintegrates and becomes a suspension (no longer an emulsion) with a very broad particle size distribution. The reaction temperature is allowed to rise to 56.9% °C. and is then warmed to 61.2° C. The batch is then allowed to cool to 50±1° C. After 3 hours at a temperature at or above 48.6° C., the batch is cooled and the sedimentation index is determined. An SI value of 95 is obtained, and the bulk viscosity is 1,900 cps measured using a Brookfield LVT viscometer with #3 spindle @ 30 rpm and 25° C.

EXAMPLES 32 and 33 (Comparative)

Using the same basic techniques and conditions as was used for Examples 1-15, two 30 mole % sodium acrylate/70 mole % AMD copolymer emulsions are prepared. For these two examples the polymerization pH is 8.0-8.1 (adjusted with sodium hydroxide solution), the total monomer concentration is 40.1%, the initiator system is the redox couple of t-butyl hydroperoxide/SO$_2$ and the total emulsifier concentration is 2.0%. Results of bulk viscosity and centrifuge/separation determinations are listed in Table IV.

TABLE IV

30 Mole % Sodium Acrylate/70 Mole % Acrylamide Copolymer Emulsions

| Example | Emulsifer(s) (%) | Emulsion B.V., CPS | Oil, % | Sediments |
|---|---|---|---|---|
| 32 | FDAE (2.0) | 1,660 | 5.7 | 36 |
| 33 | FDAE (1.5) Co-surfactant of Example 4 (0.5) | 950 | 7.5 | 30 |

As can be seen, the FDAE alone results in an emulsion having as unacceptable SI value (Example 32) and so does the Emulsifier system of Example 33 which, according to the results of previous examples, would be believed to be a valuable system. This example shows that when anionic polymer emulsions are being prepared in accordance with this invention, the HLB of the co-surfactant should be as low as possible, an HLB of 7.9 in this instance being too high; see however, Example 19 where a lower HLB mixed co-surfactant system produces an acceptable emulsion.

EXAMPLE 34

Again following the procedure of Examples 1-15, except that the only monomer in the aqueous phase is methacryloxyethyl trimethylammonium chloride, a stable emulsion is produced.

We claim:

1. In the process for preparing a stable, water-in-oil emulsion containing a water-soluble polymer by the emulsion polymerization of water-soluble monomers in the presence of a partially esterified, lower N,N-dialkanol fatty amide emulsifier, the ratio of the aqueous phase to the oil phase ranging from about 2 to 1 to about 3.5 to 1 and the monomer content of the emulsion being at least about 20%, by weight, based on the total weight of the emulsion, the improvement which comprises polymerizing said monomers in the presence of a second emulsifier comprising a non-ionic, reaction product of ethylene oxide and a long chain compound containing a reactive hydroxyl and/or carboxyl group and having an HLB of above 5 but less than 14, the total weight of the emulsifiers comprising about 1-5% of the emulsion, and the second emulsifier constituting from about 10 to 150% of the weight of the fatty amide and containing less than 0.1 weight percent of sorbitan, sorbitol, mixtures thereof and derivatives thereof and wherein said water-soluble monomers are (meth)acrylamide or mixtures of (meth)acrylamide and at least one monoethylenically unsaturated comonomer copolymerizable therewith.

2. A process according to claim 1 wherein the HLB ranges from about 6 to 9.

3. A process according to claim 2 wherein said polymer is a homopolymer or a copolymer of acrylamide.

4. A process according to claim 2 wherein the partially esterified lower N,N-dialkanol fatty amide is the reaction product of N,N-diethanolamine and oleic acid.

5. A process according to claim 2 wherein said second emulsifier is a reaction product of ethylene oxide and a long chain fatty acid.

6. A process according to claim 2 wherein said second emulsifier is a reaction product of ethylene oxide and a long chain alcohol.

7. A process according to claim 6 wherein said second emulsifier is a reaction product of ethylene oxide and a alkyl phenol.

8. A process according to claim 5 wherein said second emulsifier is a reaction product of ethylene oxide and hydroxystearic acid.

9. A process according to claim 1 wherein said comonomer is (meth)acrylic acid or a salt thereof, an alkyl (meth)acrylate, a dialkylaminoalkyl (meth)acrylate or acid or quaternary salt thereof, a dialkylaminoalkyl (meth)acrylamide or acid or quaternary salt thereof, a diallyldialkylammonium halide or mixtures thereof.

* * * * *